US012702883B2

(12) United States Patent
Kjellman

(10) Patent No.: US 12,702,883 B2
(45) Date of Patent: Aug. 11, 2026

(54) SYSTEM ACTUATOR WITH SPRING RELEASE COMPRESSION

(71) Applicant: KIDDE-FENWAL, LLC, Ashland, MA (US)

(72) Inventor: Thomas Kjellman, Uxbridge, MA (US)

(73) Assignee: Kidde-Fenwal, LLC, Ashland, MA (US)

( * ) Notice: Subject to any disclaimer, the term of this patent is extended or adjusted under 35 U.S.C. 154(b) by 390 days.

(21) Appl. No.: 18/341,105

(22) Filed: Jun. 26, 2023

(65) Prior Publication Data

US 2024/0001187 A1 Jan. 4, 2024

Related U.S. Application Data

(60) Provisional application No. 63/356,770, filed on Jun. 29, 2022.

(51) Int. Cl.

*A62C 37/42* (2006.01)
*A62C 3/00* (2006.01)
*A62C 37/46* (2006.01)
*A62C 99/00* (2010.01)

(52) U.S. Cl.

CPC .............. *A62C 37/42* (2013.01); *A62C 37/46* (2013.01); *A62C 99/009* (2013.01); *A62C 3/006* (2013.01)

(58) Field of Classification Search

CPC ....... A62C 37/42; A62C 37/46; A62C 99/009; A62C 3/006; A62C 3/242
USPC ............................................... 169/47, 56, 65
See application file for complete search history.

(56) References Cited

U.S. PATENT DOCUMENTS

| | | | | | |
|---|---|---|---|---|---|
| 2,897,304 | A * | 7/1959 | Kjellman | H01H 35/42 73/335.14 |
| 3,378,081 | A * | 4/1968 | O'Reilly | A62C 37/42 169/17 |
| 4,979,572 | A * | 12/1990 | Mikulec | A62C 3/006 239/524 |
| 5,601,505 | A * | 2/1997 | Tada | F01L 1/02 474/110 |
| 6,286,604 | B1 * | 9/2001 | Ou | A62C 37/46 169/56 |
| 2013/0092404 | A1 * | 4/2013 | Mikulec | A62C 3/006 169/65 |
| 2015/0231432 | A1 * | 8/2015 | Zlatintsis | A62C 37/46 169/61 |
| 2020/0338376 | A1 * | 10/2020 | Kjellman | A62C 37/42 |

FOREIGN PATENT DOCUMENTS

| | | | | | |
|---|---|---|---|---|---|
| CN | 104906737 | A * | 9/2015 | A62C 37/48 |
| EP | 2711053 | A1 * | 3/2014 | A62C 37/42 |

* cited by examiner

*Primary Examiner* — Kevin Edward Schwartz
(74) *Attorney, Agent, or Firm* — Honigman LLP; Andrew J. Boes

(57) ABSTRACT

An actuation mechanism for use in a fire suppression system includes a housing and a plunger operably coupled to and movable relative to the housing. A tension member is operably coupled to the plunger and applies a tension to the plunger in a first direction. A force generating component is operably coupled to the plunger. A stopper is movably coupled to the housing and is operable in combination with the force generating component to apply a force on the plunger in a second direction.

6 Claims, 8 Drawing Sheets

SYSTEM ACTUATOR WITH SPRING RELEASE COMPRESSION

CROSS-REFERENCE TO RELATED APPLICATIONS

This application claims the benefit of U.S. Application No. 63/356,770, filed Jun. 29, 2022, the contents of which are incorporated by reference herein in their entirety.

BACKGROUND

Embodiments of the present disclosure relate to fire suppression systems, and more specifically to actuators for fire suppression systems.

Some fire mitigation methods, such as the discharge of a fire suppression agent for example, generally occurs through the use of an intermediary device coupled to a detection device. An example of such an intermediary device is a mechanical panel. Intermediary devices are generally included due to the difficulty associated with installing an actuator with direct cable operation for pressurized cylinder of fire suppression agent. Opening or closing of such an actuator during setup while the cable tension is being set may result in an unintentional release of fire suppression agent.

BRIEF DESCRIPTION

According to an embodiment, an actuation mechanism for use in a fire suppression system includes a housing and a plunger operably coupled to and movable relative to the housing. A tension member is operably coupled to the plunger and applies a tension to the plunger in a first direction. A force generating component is operably coupled to the plunger. A stopper is movably coupled to the housing and is operable in combination with the force generating component to apply a force on the plunger in a second direction.

In addition to one or more of the features described above, or as an alternative, in further embodiments the force applied by the force generating component opposes the tension applied to the plunger by the tension member.

In addition to one or more of the features described above, or as an alternative, in further embodiments the stopper is coupled to the housing via at least one fastener.

In addition to one or more of the features described above, or as an alternative, in further embodiments the stopper is coupled to the housing via at least one magnet.

In addition to one or more of the features described above, or as an alternative, in further embodiments the force applied to the plunger by the force generating component is dependent on a position of the stopper relative to the housing.

In addition to one or more of the features described above, or as an alternative, in further embodiments the stopper is configured to restrict movement of the force generating component relative to the housing in the first direction.

In addition to one or more of the features described above, or as an alternative, in further embodiments the force generating component is a coil spring.

In addition to one or more of the features described above, or as an alternative, in further embodiments the force generating component is one of a pneumatic and hydraulic fluid.

In addition to one or more of the features described above, or as an alternative, in further embodiments the plunger has a flange and interference between the flange and the housing is configured to restrict movement of the plunger relative to the housing in the first direction.

According to an embodiment, a fire suppression system includes a tension member, a valve movable between a closed position and an open position to discharge fire suppression agent from a pressurized canister, and an actuation mechanism directly coupled to the tension member. The actuation mechanism is operable to transform the valve to the open position in response to a loss of tension in the tension member.

In addition to one or more of the features described above, or as an alternative, in further embodiments comprising a heat sensor operably coupled to the tension member, wherein activation of the heat sensor is configured to remove tension from the tension member.

In addition to one or more of the features described above, or as an alternative, in further embodiments comprising a manual pull station operably coupled to the tension member, wherein activation of the manual pull station is configured to remove tension from the tension member.

According to an embodiment, a method of operating an actuation mechanism includes connecting a tension member having tension applied thereto to a first end of a plunger, the plunger being operably coupled to a housing, adjusting a position of a stopper relative to the housing, and applying a force to the plunger via a force generating component, wherein the force opposes the tension of the tension member.

In addition to one or more of the features described above, or as an alternative, in further embodiments adjusting the position of the stopper alters the force applied to the plunger via the force generating component.

In addition to one or more of the features described above, or as an alternative, in further embodiments comprising removing the tension from the tension member and moving the plunger relative to the housing to activate a fire suppression system.

In addition to one or more of the features described above, or as an alternative, in further embodiments moving the plunger relative to the housing to activate the fire suppression system further comprises restricting movement of the force generating component via the stopper.

In addition to one or more of the features described above, or as an alternative, in further embodiments moving the plunger relative to the housing to activate the fire suppression system further comprises opening a valve to release a fire suppression agent.

In addition to one or more of the features described above, or as an alternative, in further embodiments removing the tension from the tension member occurs in response to activation of a detector operably coupled to the tension member.

In addition to one or more of the features described above, or as an alternative, in further embodiments removing the tension from the tension member occurs in response to activation of a manual pull station operably coupled to the tension member.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
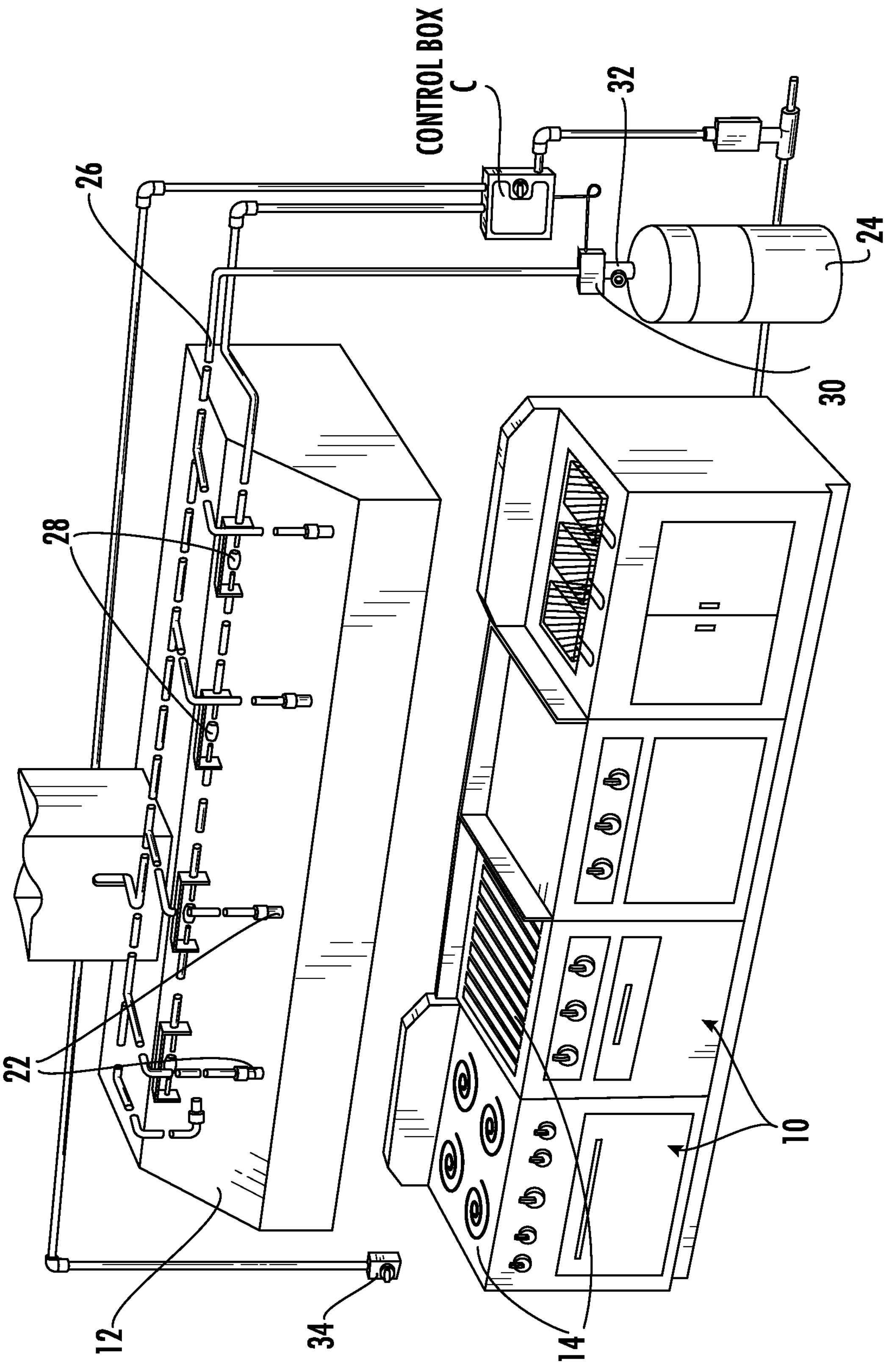
FIG. 1 is a schematic diagram of an exemplary system for delivering a fire suppression agent to at least one cooking appliance according to an embodiment.

With reference now to FIG. 1, an example of a system 20 for delivering a fire suppression agent to one or more cooking appliances 10 is illustrated. The fire suppression system 20 may be located separate or remotely from the cooking appliance 10, such as within a vent hood 12, or alternatively, may be integrated or housed at least partially within a portion of the cooking appliance 10. It should be understood that the configuration of the fire suppression system 20 may vary based on the overall structural design of the cooking appliance 10. The fire suppression system 20 includes one or more spray nozzles 22 associated with the cooking appliance 10 and a source of fire suppression agent 24 in the form of at least one self-contained pressurized canister. In embodiments including a plurality of cooking appliances 10, one or more spray nozzles 22 may be dedicated to each cooking appliance 10, or alternatively, one or more evenly spaced spray nozzles 22 may be used for all of the cooking appliances 10.

The source of fire suppression agent 24 is arranged in fluid communication with the nozzles 22 via an agent delivery path defined by a delivery piping system 26. In the event of a fire, the fire suppression agent is allowed to flow through the delivery piping system 26 to the one or more spray nozzles 22 for release directly onto an adjacent cooking hazard area 14 of the one or more cooking appliances 10.

Those skilled in the art will readily appreciate that the fire suppression agent can be selected from materials such as water, dry chemical agent, wet chemical agent, or the like. Further, the source of fire suppression agent 24 may additionally contain a gas propellant for facilitating the movement of the fire suppression agent through the delivery piping system 26. However, embodiments where the propellant is stored separately from the fire suppression agent are also contemplated herein.

In an embodiment, the fire suppression system 20 is actuated in response to a fire sensing device (illustrated schematically at 28), such as a smoke detector or a heat sensor, for example. In response to heat or smoke exceeding an allowable limit, a control box C will direct a signal to an actuator 30 to open a valve 32 to allow the fire suppression agent to flow from the source 24 to the nozzles 22. For example, in an embodiment the fire sensing device is a heat sensor including an activator bulb. When a fire is present, the increased heat resulting from the flames will cause the activator bulb to break, thereby releasing the tension on the cable connecting the fire sensing device to the control box C. Alternatively, or in addition, the fire suppression system 20 may include a manual activation system 34, also referred to herein as a manual pull station, configured to actuate the control box C to activate the valve 32 to initiate operation of the fire suppression system 20.

Figure 2:
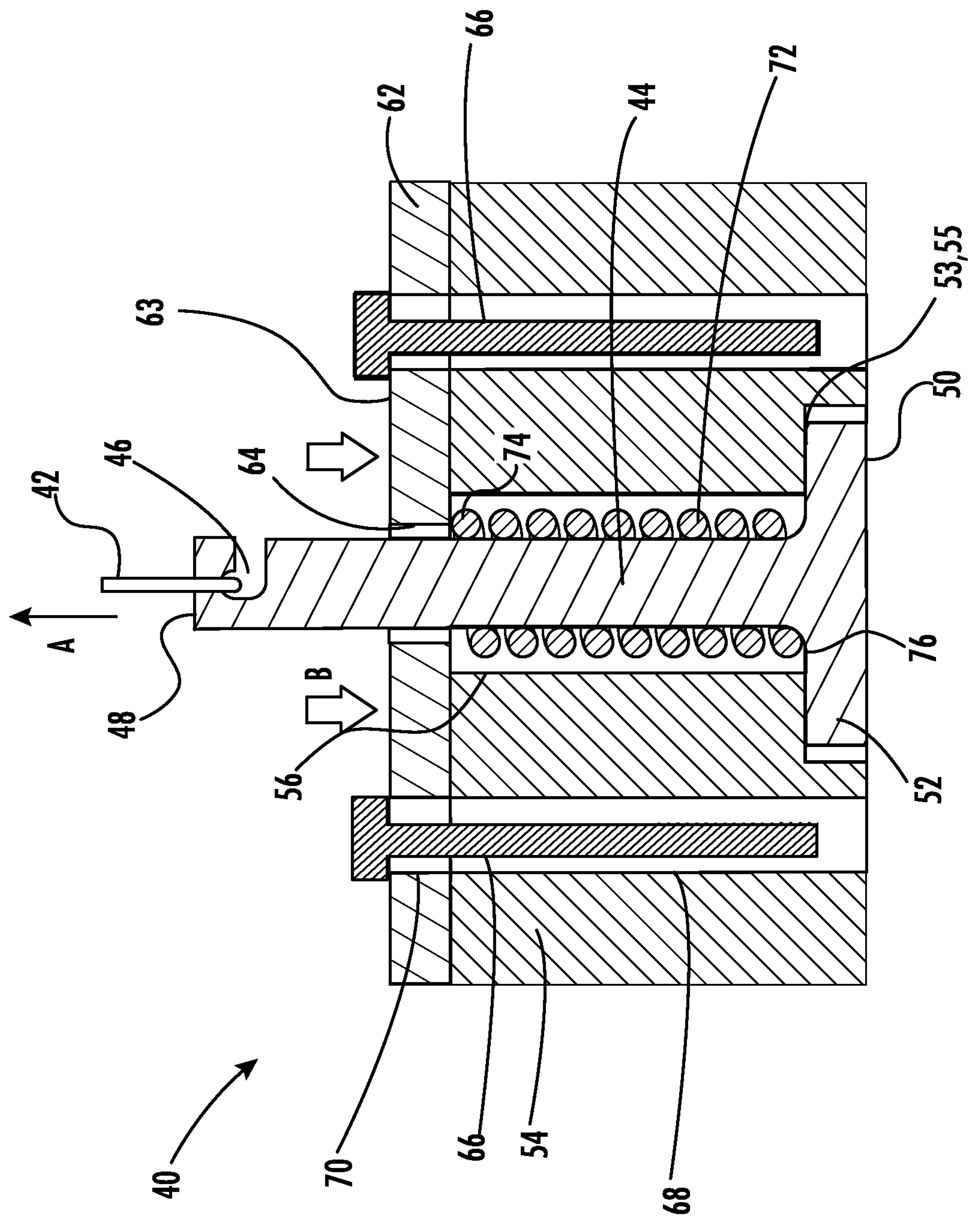
FIG. 2 is a cross-sectional view of an exemplary actuation mechanism for use in a fire suppression system according to an embodiment.
Figure 3:
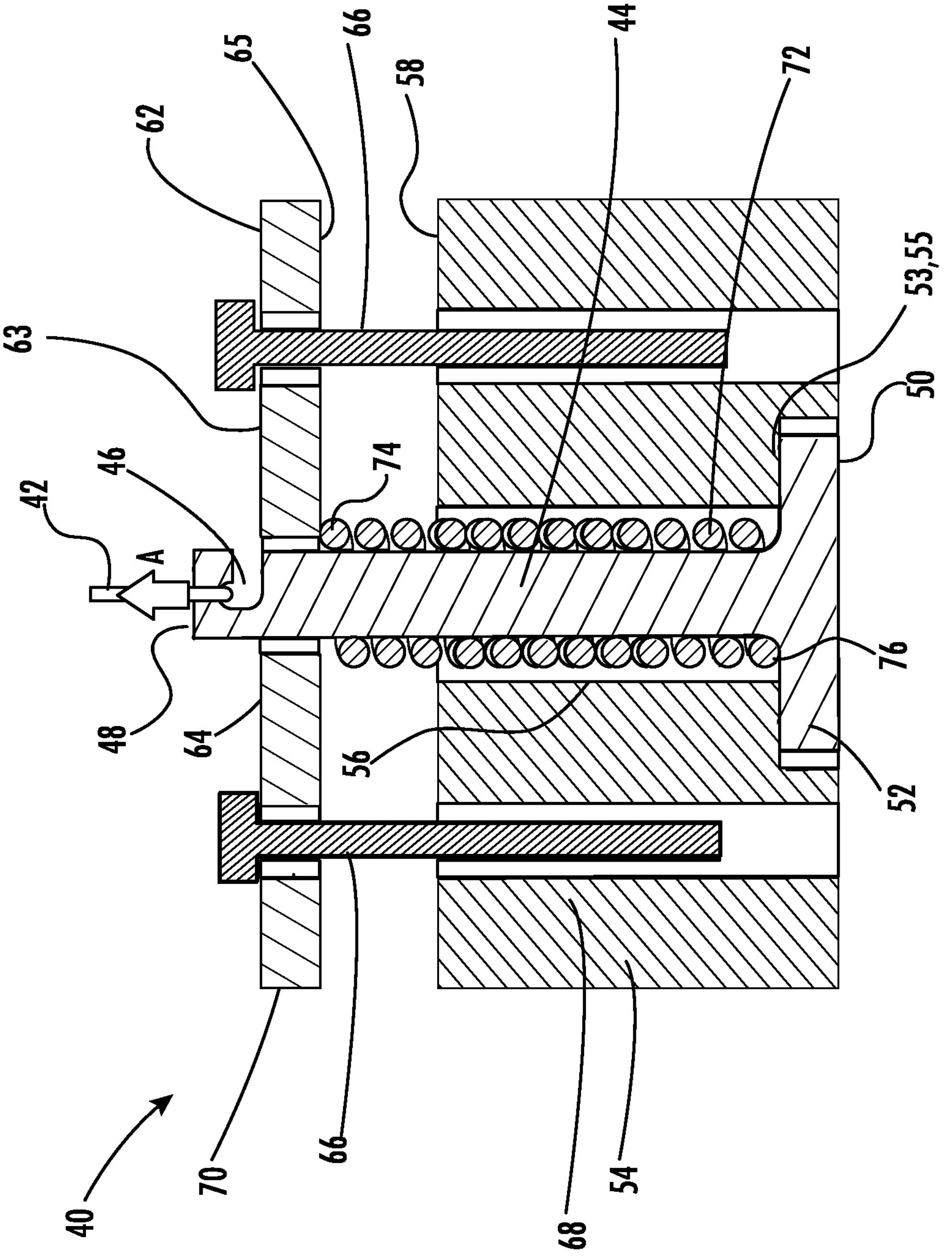
FIG. 3 is a cross-sectional view of an actuation mechanism during installation of the actuation mechanism according to an embodiment.
Figure 4:
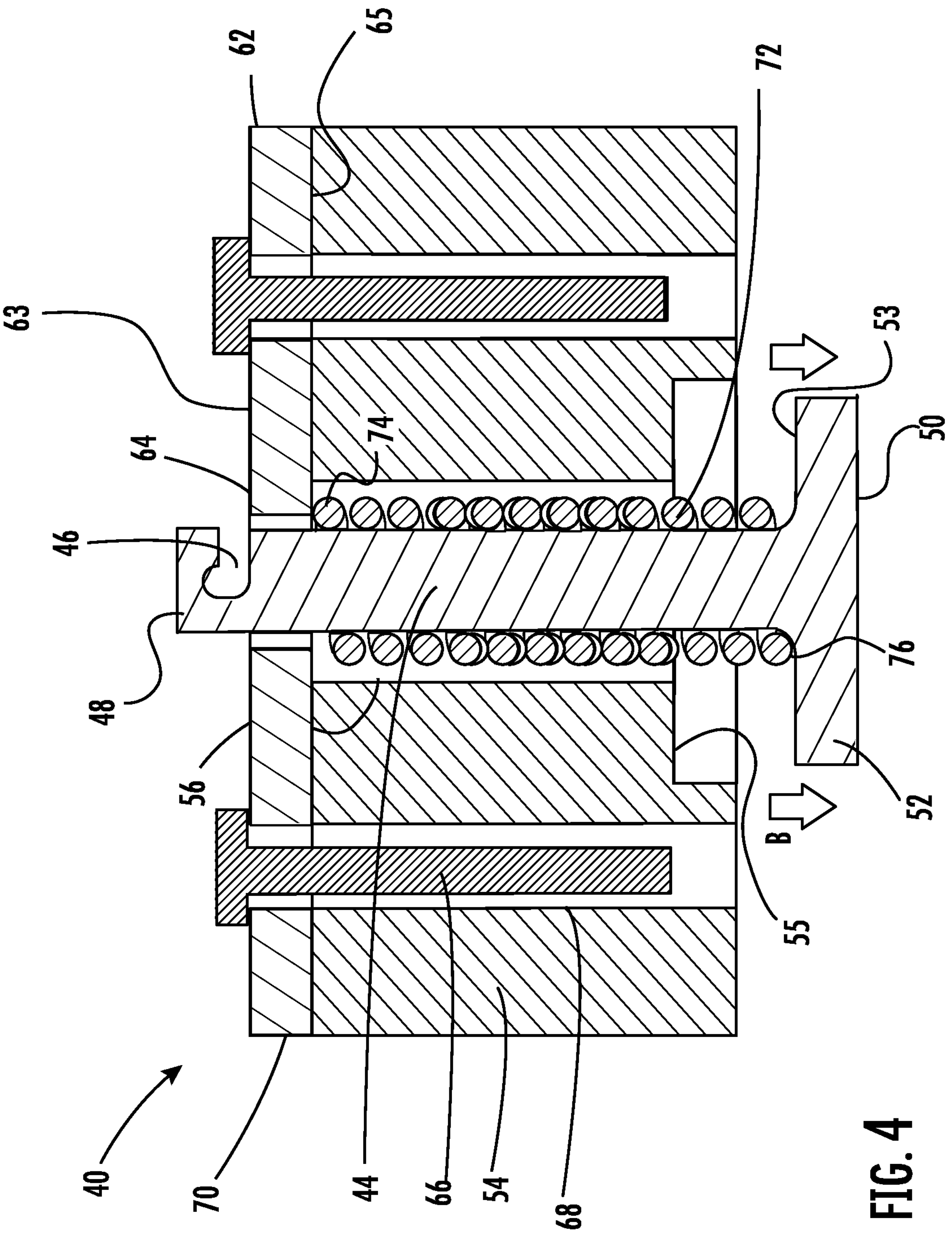
FIG. 4 is a cross-sectional view of an actuation mechanism after a loss of tension in the tension member according to an embodiment.
Figure 5B:
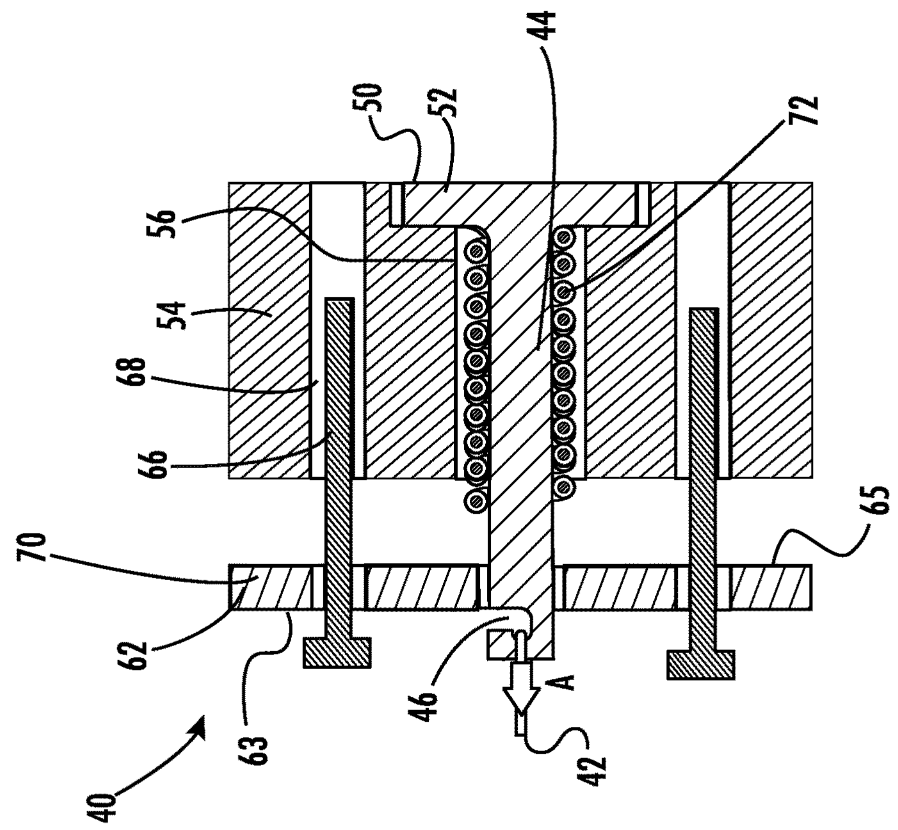
FIG. 5B is a cross-sectional view of the actuation mechanism of FIG. 5A during installation of the actuation mechanism according to an embodiment.
Figure 5A:
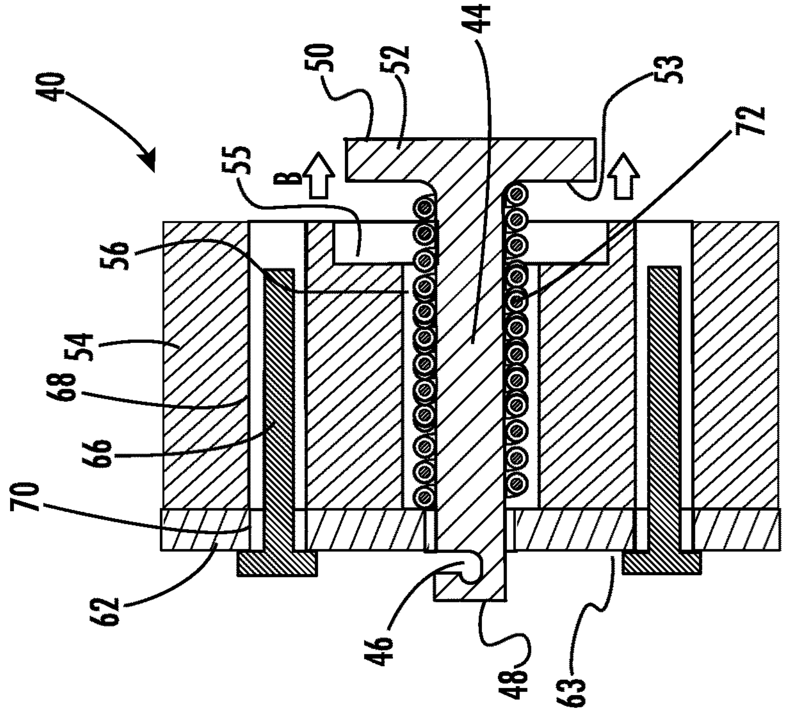
FIG. 5A is a cross-sectional view of an actuation mechanism after a loss of tension in the tension member according to an embodiment.

With reference now to FIGS. 2-4, an exemplary embodiment of an actuation mechanism 40, such as operable to selectively activate the fire suppression system 20, is illustrated. As shown, the actuation mechanism 40 includes a tension member 42, such as a rope or cable. In an embodiment, the tension member 42 is an output of the control box C of the fire suppression system 20. However, it should be understood that embodiments where the tension member 42 is operably coupled directly to the manual activation system 34 such that the actuation mechanism 40 may be considered the control box C, or part thereof for example, are also within the scope of the disclosure.

The actuation mechanism 40 includes a plunger or piston 44. Although the plunger 44 is shown as having a generally cylindrical configuration, embodiments where the plunger 44 has another shape are also contemplated herein. In an embodiment, an opening or slot 46 for receiving the tension member 42 is formed adjacent to a first end 48 of the plunger 44. However, it should be understood that the tension member 42 is connectable to the plunger 44 in any suitable manner and at any suitable location. Accordingly, the tension of the tension member 42 is configured to apply a force to the plunger 44 in a first direction indicated by arrow A in the FIGS.

A second, opposite end 50 of the plunger 44 may include a radially outwardly extending flange 52 such that a diameter of the flange 52 is greater than a diameter of the adjacent portion of the plunger 44 extending between the first and second ends 48, 52. As will be described in more detail below, the flange 52 is intended to cooperate with another component of the actuation mechanism 40 to limit or restrict movement of the plunger 44 in the direction of the tension applied thereto by the tension member 42.

The actuation mechanism 40 additionally includes a housing or body 54 having through hole 56 formed therein. A diameter of the through hole 56 may be substantially uniform over the axial length of the housing (between a first end 58 and a second end 60 thereof) or alternatively, may vary. For example, in the non-limiting embodiment illustrated in the FIGURES, the diameter of the portion of the through hole 56 located adjacent to the second end 60 of the housing 54 may be enlarged to receive the flange 52 of the plunger 44 therein. In an embodiment, the through hole 56 is sized such that the entire flange 52 is receivable within the housing 54. Further, when arranged within the through hole 56, the end 50 of the plunger 44, may but need not be substantially flush with the end 60 of the housing 54. However, interference between a surface 53 of the flange 52 and an adjacent surface 55 of the housing 54 located within the through hole 56 restricts movement of the plunger 44 relative to the housing 54 in the first direction, in response to the tension of the tension member 42.

Figure 7B:
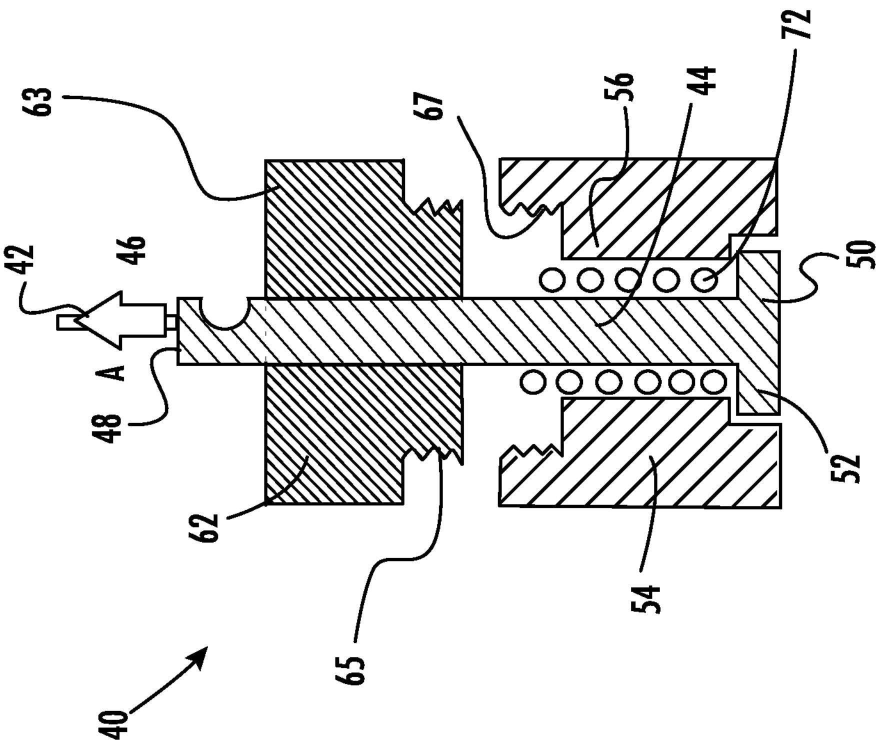
FIG. 7B is a cross-sectional view of the actuation mechanism of FIG. 7A during installation of the actuation mechanism according to an embodiment.
Figure 7A:
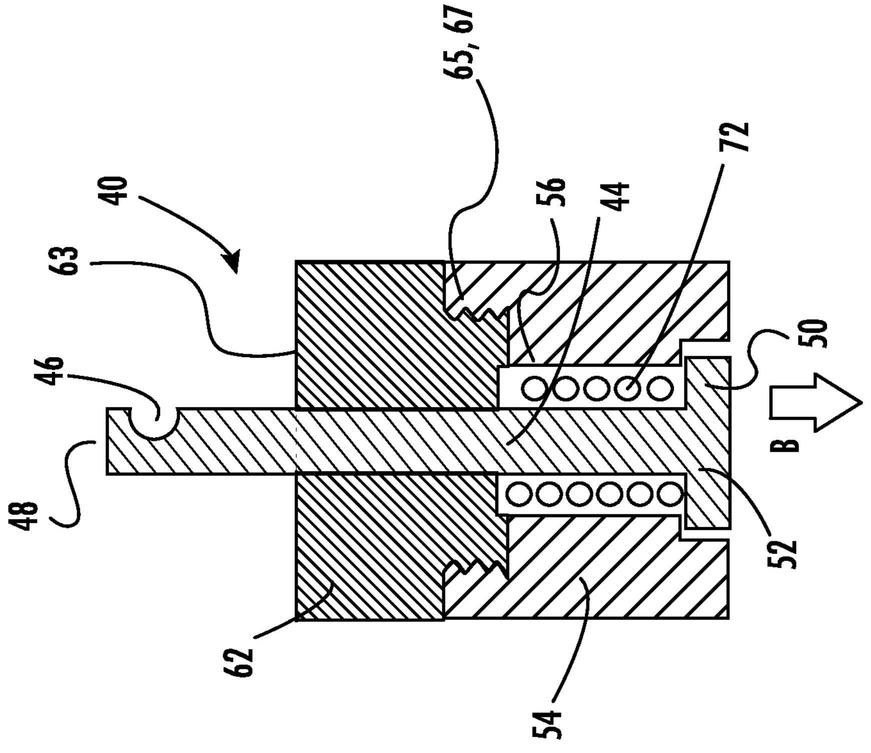
FIG. 7A is a cross-sectional view of an actuation mechanism after a loss of tension in the tension member according to an embodiment.
Figure 8A:
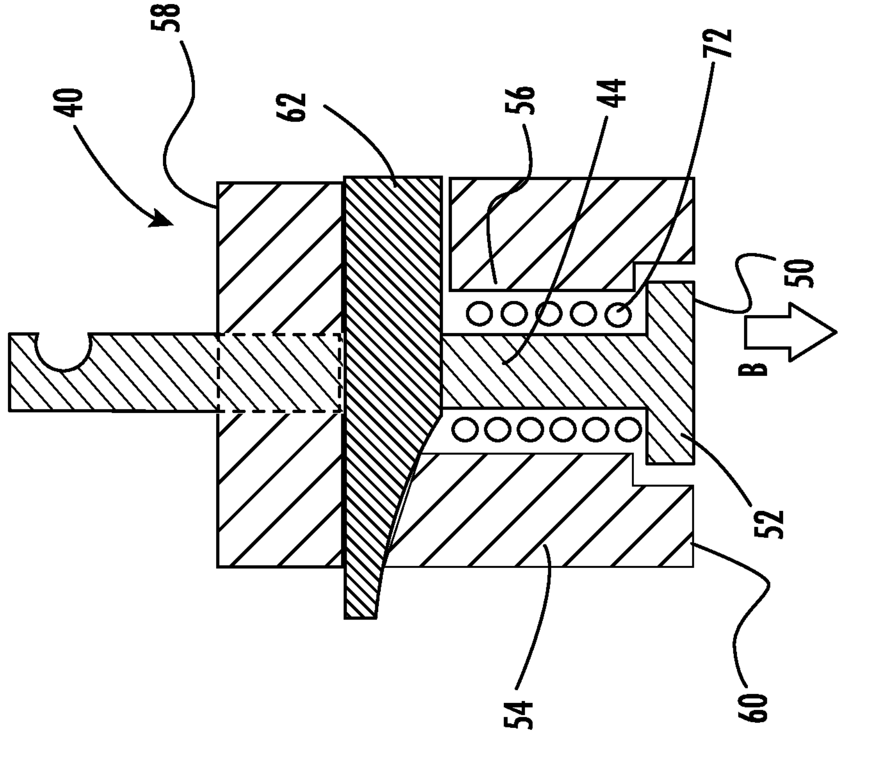
FIG. 8A is a cross-sectional view of an actuation mechanism after a loss of tension in the tension member according to an embodiment.
Figure 8B:
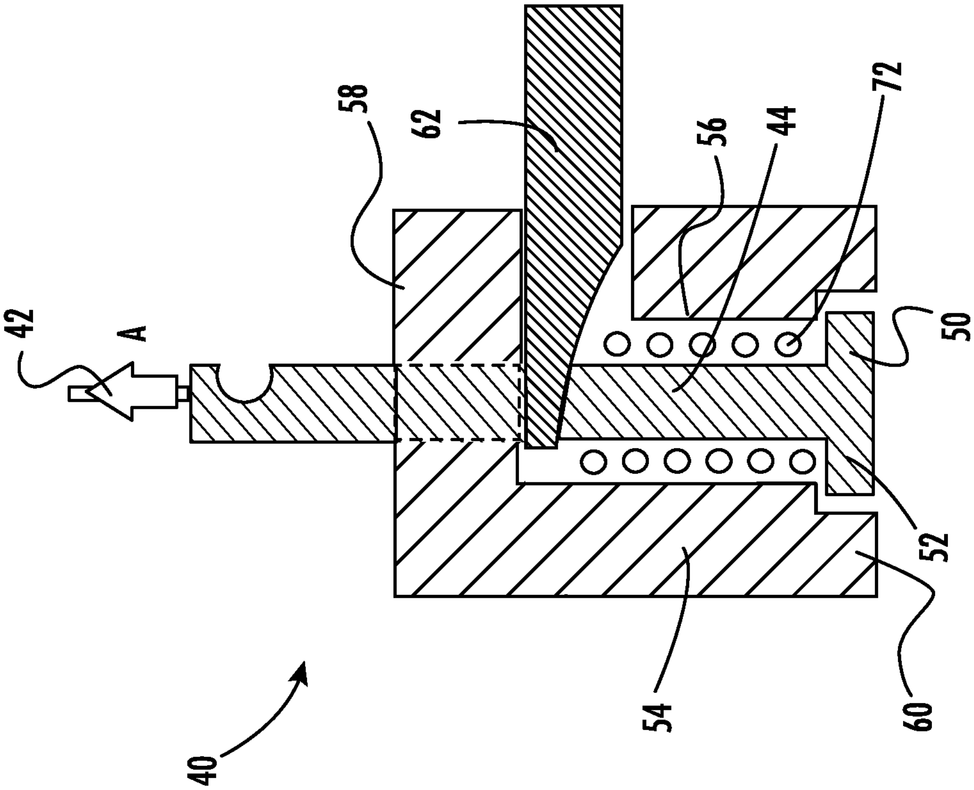
FIG. 8B is a cross-sectional view of the actuation mechanism of FIG. 8A during installation of the actuation mechanism according to an embodiment.

As shown, the actuation mechanism 40 additionally includes a stopper 62 movable relative to the housing 54. In an embodiment, the stopper 62 is positioned at and complementary to an adjacent end of the housing 54. In an embodiment, shown in FIGS. 2-5B, the cross-sectional size and/or shape of the stopper 62 may be substantially identical to that of an adjacent end of the housing 54, such as the first end 58 of the housing 54 for example. In an embodiment, the cross-section of the stopper 62 is substantially uniform over its height, measured parallel to the axis of the tension member 42. However, in other embodiments, such as shown in FIGS. 7A and 7B, the cross-sectional size and shape of the stopper 62 may vary over its height. In other embodiments, such as shown in FIGS. 8A and 8B, the stopper 62 may be positioned at an intermediate location of the housing 54, between the opposite ends 58, 60 thereof.

When the stopper 62 is located adjacent the end of the housing 54, a through hole 64 may be formed in the stopper 62 in axial alignment with the through hole 56 of the housing 54. In such embodiments, the plunger 44 is configured to extend through the through hole 64 such that the connection between the tension member 42 and the plunger 44 is disposed adjacent to a first side 63 of the stopper 62 and the housing 54 is disposed adjacent to a second, opposite side 65 of the stopper 62. As shown, the diameter of the through hole 64 formed in the stopper 62 may, but need not, be smaller than the diameter of the through hole 56 formed in the housing 54.

The stopper 62 is selectively movable relative to the housing 54, and therefore may be connected to the housing 54 in any suitable manner or via any suitable coupling mechanism. In the illustrated, non-limiting embodiment of FIGS. 2-5B, at least one fastener, such as one or more threaded fasteners 66, is used to couple the stopper 62 to the housing 54. As shown, a plurality of fastener openings 68, 70 are formed in the housing 54 and the stopper 62, respectively. Although the fastener openings 68, 70 are illustrated as being oriented substantially parallel to the through holes 56, 64, embodiments where the fastener openings 68, 70 have another configuration are also within the scope of the disclosure. A nut (not shown) operably coupled to a fastener 66 arranged within the fastener openings 68, 70 of the housing 54 and stopper 62 may be tightened to move the stopper 62 towards the housing 54. Alternatively, the fastener openings 68 within at least the housing 54 may be formed with a plurality of internal threads. In such embodiments, a head of a fastener 66 arranged contact with a surface of the stopper 62 may be rotated to move the stopper 62 towards or away from the housing 54.

Figure 6B:
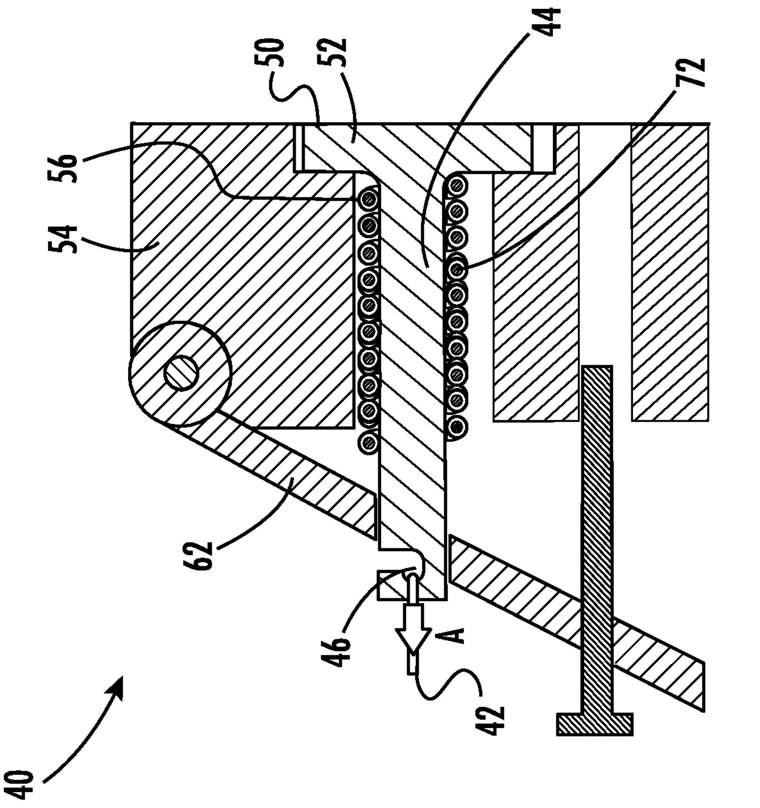
FIG. 6B is a cross-sectional view of the actuation mechanism of FIG. 6A during installation of the actuation mechanism according to an embodiment.
Figure 6A:
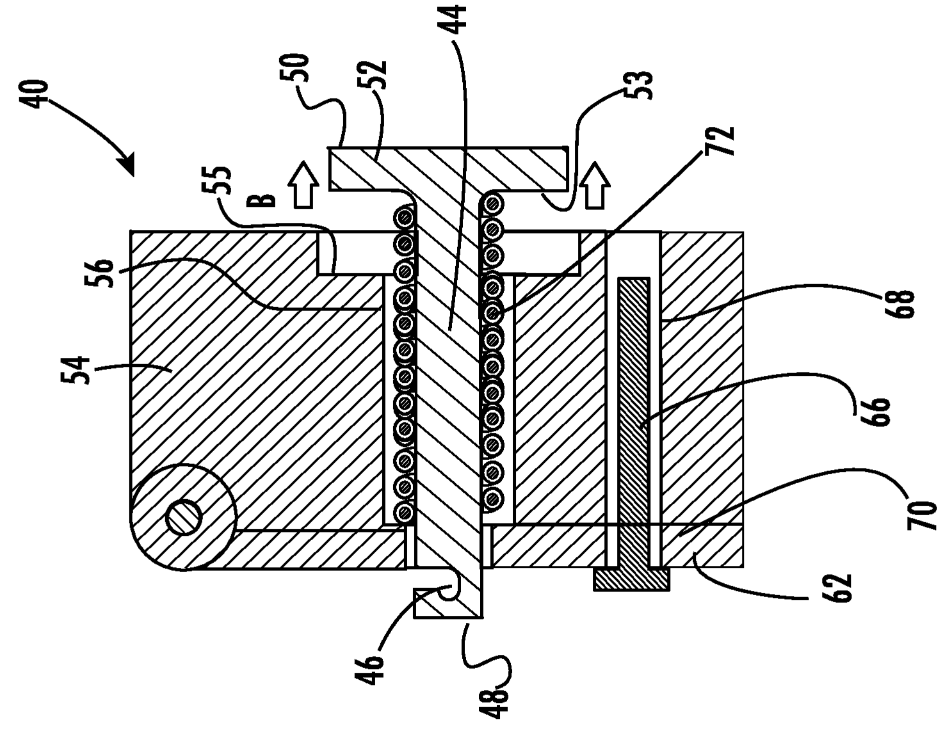
FIG. 6A is a cross-sectional view of an actuation mechanism after a loss of tension in the tension member according to an embodiment.

In another embodiment, best shown in FIGS. 6A and 6B, the stopper 62 is rotatable about an axis relative to the housing 54. In a first configuration (FIG. 6A), the stopper 62 is oriented substantially parallel to the adjacent surface of the housing 54, and in the second configuration (FIG. 6B), the stopper 62 is arranged at a non-parallel angle relative to the end of the housing 54. In yet another embodiment, shown in FIGS. 7A and 7B, the stopper 62 may include a plurality of threads 65 complementary to a plurality of threads 67 formed into a surface of the housing 54. Accordingly, the stopper 62 is configured to rotate within a plane about an axis, such as the axis of the plunger 44 for example, to selectively couple and decouple to the housing 54. In another embodiment, as shown in FIGS. 8A and 8B, the stopper 62 is slidable into an opening formed at a central portion of the housing 54 between the opposite ends thereof. In such embodiments, the end of the stopper 62 receivable within the housing 54 may be slanted or tapered.

It should be understood that any suitable fastener or mechanism for moving and/or affixing the stopper 62 relative to the housing 54 is within the scope of the disclosure. For example, in an embodiment, at least one of the housing 54 and the stopper 62 has one or more magnets connected thereto. In such embodiments, the other of the housing 54 and the stopper 62 is formed from or includes a magnetic material, such that the interaction between the magnetic field of the one or more magnets and the magnetic material functions as a fastener to restrict movement of the stopper 62 relative to the housing 54.

The actuation mechanism 40 additionally includes a force generating component 72 operably coupled to the plunger 44. The force generating component 72 is configured to apply a force to the plunger 44, indicated by arrow B, in a second direction, opposite the tension of the tension member 42. In the illustrated, non-limiting embodiments, the force generating component 72 is a biasing mechanism, such as a coil spring for example. As shown, the biasing mechanism 72 is arranged within the through hole 56 of the housing 54 such that at least a portion the plunger 44 extends through the biasing mechanism 72. A first end 74 of the biasing mechanism 72 may be configured to abut a portion of the stopper 62 and a second, opposite end 76 of the biasing mechanism 72 is seated against the flange 52 of the plunger 44. As a result, the position of the stopper 62 can be adjusted to control the force of the force generating component acting on the plunger 44, such as the compressive force of the biasing mechanism for example.

To set the actuation mechanism 40, the stopper 62 is moved relative to the housing 54, such as towards and into contact with the housing 54 for example. This movement opposes the biasing force of the biasing mechanism 72, thereby compressing the biasing mechanism 72. When the tension applied by the tension member 42 to the plunger 44 is removed, the stopper 62 is restricted from moving relative to the housing 54, such as by the fasteners 66 for example. The interaction between the stopper 62 and the force generating component 72 restricts movement of the force generating component 72 in the first direction. As a result, the force of the biasing mechanism 72 biases the plunger 44 outwardly from the housing 54, such as into engagement with a switch to transform a valve, such as valve 32 for example, from a closed position to an open position. Although the actuation mechanism 40 is described with respect to operation of the valve 32 and the release of suppression agent, embodiments where the actuation mechanism 40 is operable to perform another task, such as to shut off the fuel or gas associated with the cooking appliance 10 are also contemplated herein.

It should be understood that embodiments including another force generating component are also within the scope of the disclosure. For example, in embodiments where the stopper 62 is sealed to the housing 54, the pressure generated by compression of a fluid, such as a hydraulic or pneumatic fluid for example, may be used to oppose the tension in the tension member 42 and to move the plunger 44 in response to a loss of tension in the tension member 42.

An actuation mechanism 40 as described herein allows the fire suppression system to be easily and directly actuated in response to the release of tension from the tension member 42. As a result, the complexity and additional cost associated with conventional intermediary components may be eliminated. Further, the actuation mechanism 40 minimizes the risk of unintentional actuation when setting the plunger 44.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An actuation mechanism for use in a fire suppression system comprising:

a housing having a first fastener opening;

a plunger operably coupled to the housing, the plunger being movable relative to the housing;

a tension member operably coupled to the plunger, wherein the tension member applies a tension to the plunger in a first direction;

a force generating component operably coupled to the plunger;

a fastener;

a stopper having a second fastener opening, the fastener threadedly disposed within the first fastener opening and the second fastener opening so as to couple the stopper to the housing and adjust a position of the stopper to the housing, the force generating component continuously applying a force on the plunger in a second direction, wherein the force of the force generating component is adjusted with respect to a displacement of the stopper to the housing and the stopper is configured to restrict movement of the force generating component relative to the housing in the first direction.

2. The actuation mechanism of claim 1, wherein the force applied by the force generating component opposes the tension applied to the plunger by the tension member.

3. The actuation mechanism of claim 1, wherein the stopper is coupled to the housing via at least one magnet.

4. The actuation mechanism of claim 1, wherein the force generating component is a coil spring.

5. The actuation mechanism of claim 1, wherein the force generating component is one of a pneumatic and hydraulic fluid.

6. The actuation mechanism of claim 1, wherein the plunger has a flange and wherein an interference between the flange and the housing is configured to restrict movement of the plunger relative to the housing in the first direction.

* * * * *